US006779637B2

(12) United States Patent
Aoi et al.

(10) Patent No.: US 6,779,637 B2
(45) Date of Patent: Aug. 24, 2004

(54) DYNAMIC DAMPING DEVICE FOR STEERING SYSTEM

(75) Inventors: Takahiro Aoi, Komaki (JP); Masaaki Hamada, Konan (JP); Hideki Oshima, Komaki (JP); Rentaro Kato, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/206,744

(22) Filed: Jul. 26, 2002

(65) Prior Publication Data

US 2003/0019704 A1 Jan. 30, 2003

(30) Foreign Application Priority Data

Jul. 30, 2001 (JP) ........................................ 2001-229681

(51) Int. Cl.[7] .................................................. F16F 7/10
(52) U.S. Cl. ............................ 188/379; 74/552; 74/574
(58) Field of Search ................................ 188/378, 379, 188/380; 74/552, 573 R, 574

(56) References Cited

U.S. PATENT DOCUMENTS

| | | | | |
|---|---|---|---|---|
| 5,884,902 A | * | 3/1999 | Hamada et al. ............. | 267/141 |
| 5,996,959 A | * | 12/1999 | Gassen et al. .............. | 248/635 |
| 6,296,416 B1 | * | 10/2001 | Oreans et al. .............. | 403/220 |
| 6,445,149 B1 | * | 9/2002 | Muramatsu et al. ......... | 318/114 |
| 6,508,343 B2 | * | 1/2003 | Misaji et al. ............... | 188/379 |
| 6,536,566 B2 | * | 3/2003 | Hasegawa et al. .......... | 188/378 |
| 6,554,112 B2 | * | 4/2003 | Kato et al. .................. | 188/379 |
| 2002/0113351 A1 | * | 8/2002 | Kato et al. .................. | 267/141 |
| 2002/0144873 A1 | * | 10/2002 | Kato et al. .................. | 188/378 |

FOREIGN PATENT DOCUMENTS

| | | |
|---|---|---|
| JP | 7-14716 | 2/1995 |
| JP | 8-127347 | 5/1996 |
| JP | 10-267075 | 10/1998 |
| JP | 2824382 | 11/1998 |
| JP | 2001-71916 | 3/2001 |

* cited by examiner

*Primary Examiner*—Robert A. Siconolfi
*Assistant Examiner*—Devon Kramer
(74) *Attorney, Agent, or Firm*—Beyer Weaver & Thomas, LLP

(57) ABSTRACT

Disclosed is a dynamic damping device for a steering system of an automotive vehicle, which equipped with a telescopic steering column, including a plurality of mutually independent dynamic dampers, each including a mass member and a spring member for elastically supporting the mass member to the steering column or wheel. At least two of natural frequencies of the plurality of dynamic dampers are tuned to a higher and a lower frequency range in relation to a central value of a range of variation in a natural frequency of the steering wheel due to an expansion or contraction of the telescopic steering column, within the range of vibration in the natural frequency of the steering wheel. Further, a difference between adjacent ones of the natural frequencies of the plurality of dynamic dampers is made held within 10–40% of the central value of the range of vibration in the natural frequency of the steering wheel.

7 Claims, 8 Drawing Sheets

DYNAMIC DAMPING DEVICE FOR STEERING SYSTEM

INCORPORATED BY REFERENCE

The disclosures of Japanese Patent Application No. 2001-229681 filed on Jul. 30, 2001 including the specification, drawings and abstract, are incorporated herein by reference in their entirety.

BACKGROUND OF THE INVENTION

1. Field of the Invention

The present invention relates to a dynamic damper which is adapted to be mounted on a steering column or a steering wheel of an automotive vehicle for the purpose of damping or attenuating vibrations excited in a steering wheel.

2. Description of the Related Art

A steering wheel of an automotive vehicle is generally fixed to a free end of a longitudinal steering column that is supported by the vehicle at a bound end thereof. Therefore, the steering wheel is prone to be subjected to vibrations applied thereto in a direction perpendicular to an axial direction of the steering column. Further, a driver of the vehicle almost always handles directly the steering wheel during driving the vehicle, and eventually is able to sensitively feel minute vibrations excited in the steering wheel. Since the vibrations excited in the steering wheel greatly impact on a riding comfort of the vehicle as felt by the driver, there has been a great regard for absorbing the vibrations excited in the steering wheel.

In an attempt to damp or attenuate vibrations excited in the steering wheel, a dynamic damper, which includes a mass member and a spring member for elastically supporting the mass member, has been mounted on the steering wheel or other members of the steering system, thereby providing a secondary vibration system for the steering system as a primary vibration system. A natural frequency of the secondary vibration system is tuned to a natural frequency of the steering system, so that the vibrations excited in the steering wheel may be damped.

Keeping pace with recent advancement in recognition of safety and recent tendency of upgrading automotive vehicles, a telescopic steering column has been developed in order to allow a driver to adjust a position of the steering wheel in a longitudinal direction of the vehicle, depending upon his or her body-build or affinity.

An extensive study of the dynamic damper for use in the steering system conducted by the present inventor has revealed the fact that the conventional dynamic damper is not able to exhibit a desired damping effect for vibrations excited in a steering system equipped with the telescopic steering column. Described in detail, such a steering system experiences a change of the axial length of the steering column upon adjusting the position of the steering wheel supported by the steering column. This causes a relatively large amount of change in the spring constant of the steering column for supporting the steering wheel, thereby inevitably changing a natural frequency of the steering wheel supported by the steering column over a wide frequency range. Therefore, the conventional dynamic damper that is tuned to a specific frequency range may suffer from deterioration in its damping effect depending upon the selected position of the steering wheel. That is, the conventional dynamic damper is incapable of stably exhibiting a desired damping effect with respect to vibrations excited in the telescopic steering column.

To cope with this conventional problem, it has been proposed to install on the telescopic steering column a plurality of dynamic dampers that are tuned to different frequency ranges. However, since the axial length of the telescopic steering column may vary among a great number of possible values, or may be continuously changed over a given axial distance, it is not practical to install on the telescopic steering column a great number of dynamic dampers that are tuned to a great number of possible natural frequencies of the steering wheel, respectively.

SUMMARY OF THE INVENTION

It is therefore one object of this invention to provide a dynamic damping device for use in a steering system equipped with a telescopic steering column, which is novel in construction, and which is capable of stably exhibiting an excellent vibration damping effect with respect to vibrations excited in the steering wheel while assuring a reduced number of dynamic dampers to be mounted on the steering system.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principal of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A dynamic damping device for use in a steering system equipped with a telescopic steering column of an automotive vehicle, and adapted to be mounted on a steering column and/or a steering wheel of the steering system for damping vibrations excited in the steering wheel, the dynamic damping device comprising: (a) a plurality of dynamic dampers each including a mass member and a spring member for elastically supporting the mass member with respect to the steering column or the steering wheel, the plurality of dynamic dampers being independent of each other, wherein the plurality of dynamic dampers have respective natural frequencies that are arranged such that at least two of the natural frequencies of the plurality of dynamic dampers are tuned respectively to a higher and a lower frequency range in relation to a central value of a range of variation in a natural frequency of the steering wheel due to an expansion or contraction of the telescopic steering column, and held within the range of vibration in the natural frequency of the steering wheel, and such that differences between adjacent ones of the natural frequencies of the plurality of dynamic dampers are held within 10–40% of the central value of the range of vibration in the natural frequency of the steering wheel.

According to this mode of the invention, the dynamic damping device includes the plurality of dynamic dampers whose natural frequencies are uniquely tuned as described above. This arrangement enables the dynamic damping device to damp vibrations excited in the steering wheel with efficiency and stability with the help of a fewer number of dynamic dampers, even when the natural frequency of the steering wheel is changed due to a positioning operation of the steering wheel.

If the natural frequencies of the plurality of dynamic dampers are tuned to one of the higher and lower frequency ranges in relation to the central value of the range of vibration in the natural frequency of the steering wheel, the dynamic damping device may suffer from difficulty in exhibiting a desired damping effect with respect to vibrations excited in the steering wheel whose frequencies corresponding to the other one of the higher and lower frequency ranges. In addition, if the differences between the adjacent ones of the natural frequencies of the plurality of dynamic dampers are deviate from 10–40% of the central value of the range of vibration in the natural frequency of the steering wheel, the dynamic damping device become ineffective with respect to a frequency range within the range of vibration in the natural frequency of the steering wheel. As a result, the vibration condition of the steering wheel may be deteriorated depending upon the selected position of the steering wheel. Described in detail, if the difference between the adjacent ones of the natural frequencies of the dynamic dampers is made smaller than 10% of the central value of the possible natural frequency range of the steering wheel, damping effects of these two dynamic dampers overlap with each other in terms of frequency, and the two dynamic dampers cooperate to exhibit a single damping effect that is similar to the damping effects exhibited by the dynamic damper having single mass member. Accordingly, the dynamic damping device become incapable of exhibiting a desired damping effect with respect to vibrations over a wide frequency range. On the other hand, if the difference between the adjacent ones of the natural frequencies of the dynamic dampers is made larger than 40% of the central value of the possible natural frequency range of the steering wheel, the damping effects exhibited by the two dynamic dampers too strongly show independence of each other in terms of their frequency characteristics to prevent deterioration of damping effects at a frequency range interposed between the adjacent natural frequencies of the two dynamic dampers. Consequently, the dynamic damping device is less likely to exhibit an excellent damping effect for a wide frequency range of input vibrations.

Namely, in the dynamic damping device for use in a steering system according to the present invention, the adjacent natural frequencies of the two dynamic dampers are relatively arranged to be held within a range of 10–40% of the central value of the variation range of the natural frequency of the steering wheel. This arrangement makes it possible to improve damping effects at the frequency range interposed between the natural frequencies of the two dynamic dampers, thereby substantially connecting or expanding frequency ranges in which the dynamic dampers can exhibit excellent damping effects. Therefore, the present dynamic damping device is suitably applicable to damp vibrations excited in the steering wheel whose natural frequencies varies due to the expansion or contraction of the telescopic steering column, and makes it possible to deal with the entire range of variation of the natural frequency of the steering wheel with a generally fewer number of dynamic dampers. Thus, the dynamic damping device of the present invention is able to exhibit a desired damping effect with stability regardless of position of the steering wheel in the central axis of the steering column, thus making it possible to provide a steering mechanism equipped with a telescopic steering column for an automotive vehicle, which assures a good riding comfort of the vehicle as felt by a driver of the vehicle.

In this mode of the present invention, the telescopic steering column should be interpreted to mean any steering column whose axial length is variable to be comply with the driver's body-build or affinity, and has a variety of structures, without any specific limitation. According to the present mode of the invention, the plurality of dynamic dampers may be desirably tuned so long as at least two of the natural frequencies of the plurality of dynamic dampers are tuned to a higher and a lower frequency range in relation to the central value of the range of variation in the natural frequency of the steering wheel, and held within the range of vibration in the natural frequency of the steering wheel. In the case where more than three dynamic dampers are employed, for example, one of the three dynamic dampers may be tuned to the central value of the variation range of the natural frequency of the steering wheel, or alternatively may be tuned to a frequency range that is located outside of the variation range of the natural frequency of the steering wheel.

(2) A dynamic damping device according to the above-indicated mode (1), wherein the natural frequencies of the plurality of dynamic dampers are all held within the range of variation in the natural frequency of the steering wheel due to an expansion or contraction of the telescopic steering column. This arrangement makes it possible to efficiently cover the range of variation of the natural frequency of the steering wheel with a fewer number of dynamic dampers. Accordingly, the dynamic damping device is able to exhibit a desired damping effect with respect to vibrations excited in the steering wheel whose natural frequencies varies as a result of the expansion or contraction of the telescopic steering column.

(3) A dynamic damping device according to the above indicated mode (1) or (2), further comprising a bracket adapted to be fixed to the steering column or the steering wheel of the steering system, and supporting the plurality of dynamic dampers. According to this mode of the invention, the plurality of dynamic dampers can be fixed to the bracket in advance, thereby improving efficiency in installing the plurality of dynamic dampers on the steering column or the steering wheel.

(4) A dynamic damping device according to any one of the above-indicated modes (1)–(3), wherein the spring member of each of the plurality of dynamic dampers comprises an elastic support member adapted to undergo shear deformation in a direction perpendicular to a central axis of the steering column or the steering wheel. In this mode of the invention, since the spring member is constituted by the elastic support member formed of a rubber elastic body, thereby effectively obtaining damping coefficient of the dynamic dampers. In addition, the elastic support member undergoes shear deformation in the vibration input direction, thereby exhibiting a relatively low spring constant. This makes it possible to easily tune the natural frequency of each of the dynamic dampers to be held within the range of variation of the natural frequency of the steering wheel, while avoiding or minimizing an enlargement of the mass member and deterioration of the durability of the spring member.

(5) A dynamic damper according to the above-indicated mode (4), wherein the elastic support member of each of the plurality of dynamic dampers has a circular shape in cross-section in the direction perpendicular to the central axis of the steering column or the steering wheel. This arrangement is effective to prevent or minimize undesirable changes in the spring constant of each spring member and in the natural frequency of each dynamic damper, if a vibration input direction with respect to the spring member changes due to the turning of the steering wheel, for example. Thus, the dynamic damping device of this mode of the invention is capable of exhibiting an excellent vibration damping effect with high stability, with respect to vibrations applied thereto in different radial directions.

(6) A dynamic damper according to the above-indicated mode (4) or (5), wherein each of the plurality of dynamic dampers is arranged such that the elastic support member has a principal elastic axis that approximately conform with a principal inertia axis of the mass member in a direction approximately parallel to the central axis of the steering column or the steering wheel. In this mode of the invention, the dynamic damping device is able to stabilize vibration attitude or condition of the mass members upon application of the vibrational load in radial directions perpendicular to the central axis of the steering wheel, making it possible for the dynamic damping device to exhibit a desired vibration damping effect in a more effective and stabile manner.

In this mode (6) of the invention, an elastic center of the elastic support member may preferably be located closer to a center of gravity of the mass member in each dynamic damper, for thereby further stabilizing vibration attitude of the mass members. Namely, this arrangement is effective to prevent or minimize a rotative or a tilting motion of the mass members when the dynamic dampers are subjected to the vibration in the direction perpendicular to the central axis of the steering wheel, permitting the dynamic damping device to exhibit a desired vibration damping effect in a further effective and stable manner. In order to locate the elastic center of the elastic support member close to the center of gravity of the mass member, each dynamic damper may have a variety of configuration. For instance, the mass member may have a cylindrical shape and is disposed radially outwardly of the elastic support member so as to protrude toward the side of the bracket, so that the elastic center of the elastic support member is located close to the center of gravity of the mass member effectively.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
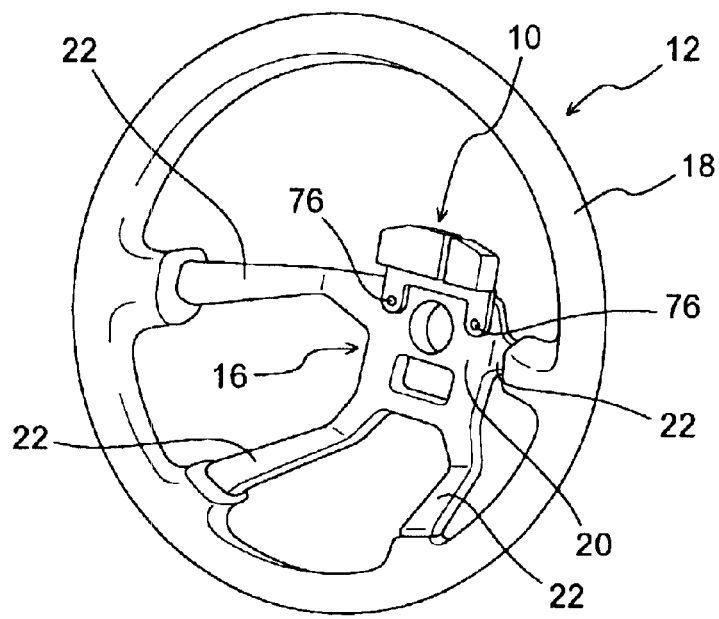
FIG. 1 is a schematic view of a dynamic damping device for a steering system, which is constructed according to a first embodiment of the present invention, where the dynamic damping device is mounted on a steering wheel of the steering system.
Figure 2:
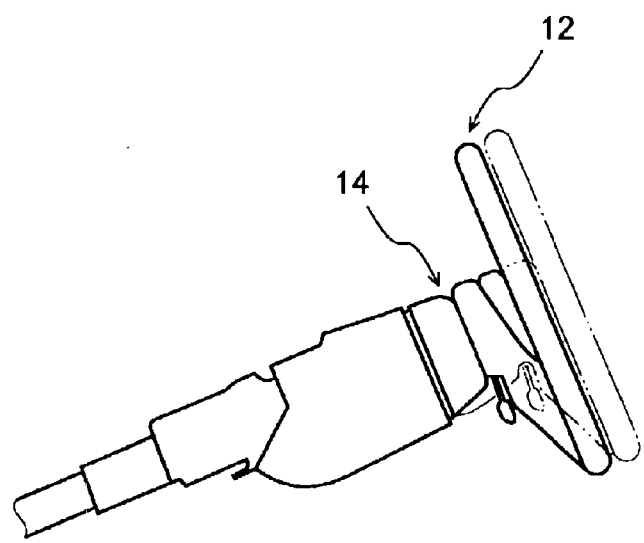
FIG. 2 is a side elevational view of a telescopic steering column of the steering system.

FIG. 1 shows a dynamic damping device 10 for use in a steering system of an automotive vehicle, constructed according to a first embodiment of the present invention, where the dynamic damping device 10 is mounted on a steering wheel 12 of the steering system. FIG. 2 schematically shows a telescopic steering column 14 of the steering system to which the steering wheel 12 is fixed.

Described more specifically, the steering wheel 12 includes a reinforcing member 16 made of rigid material such as steel and right metal, and a covering layer made of synthetic resin or the like that covers the exterior surface of the reinforcing member 16. The reinforcing member 16 is composed of an annular ring part 18, a boss part 20 positioned in the approximately center of the ring part 18, and a plurality of spokes 22 by which the ring part 18 and the boss part 20 are integrally connected with each other. As shown in FIG. 2, the steering wheel 12 is fixed to one of longitudinally opposite end portions (i.e., a free end portion) of the telescopic steering column 14. Like a conventional telescopic steering column, the telescopic steering column 14 includes a hollow rod-shaped main shaft and a sliding shaft that is slidably movably inserted into a bore of the main shaft from one of axially opposite open-end portions of the main shaft, while these members are not shown in FIG. 2. An amount of insertion of the sliding shaft into the bore of the main shaft in an axial direction is suitably changed so that the sliding shaft is suitably positioned relative to the main shaft in the axial direction. That is, the telescopic steering column 14 is capable of telescopically changing (expanding/contracting) its axial dimension, desirably. The boss part 20 of the steering wheel 12 is fixed to the tip end of the sliding shaft, so that a position of the steering wheel 12 is adjustable in a direction of a central axis of the telescopic steering column 14. In the present embodiment, the steering system functioning as a primary vibration system includes the steering column 14 and the steering wheel 12. The dynamic damping device 10 constructed according to the present invention is mounted on the steering system constructed as described above.

Figure 3:
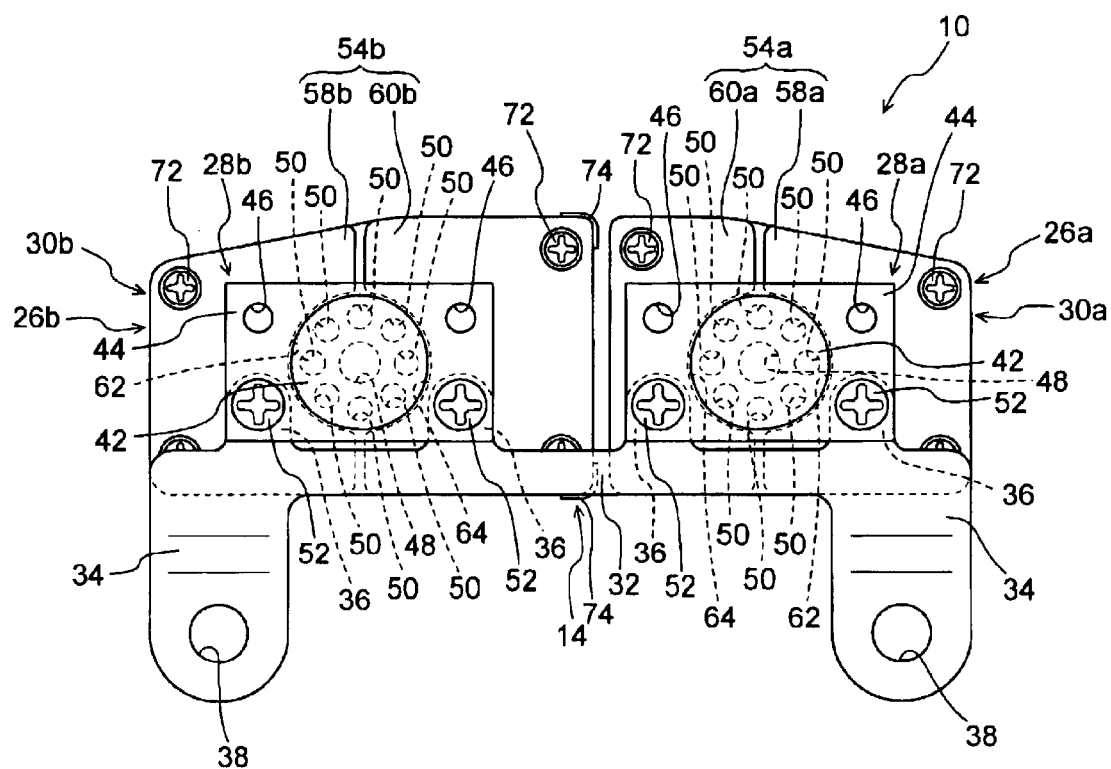
FIG. 3 is a front elevational view of the dynamic damper of FIG. 1.
Figure 4:
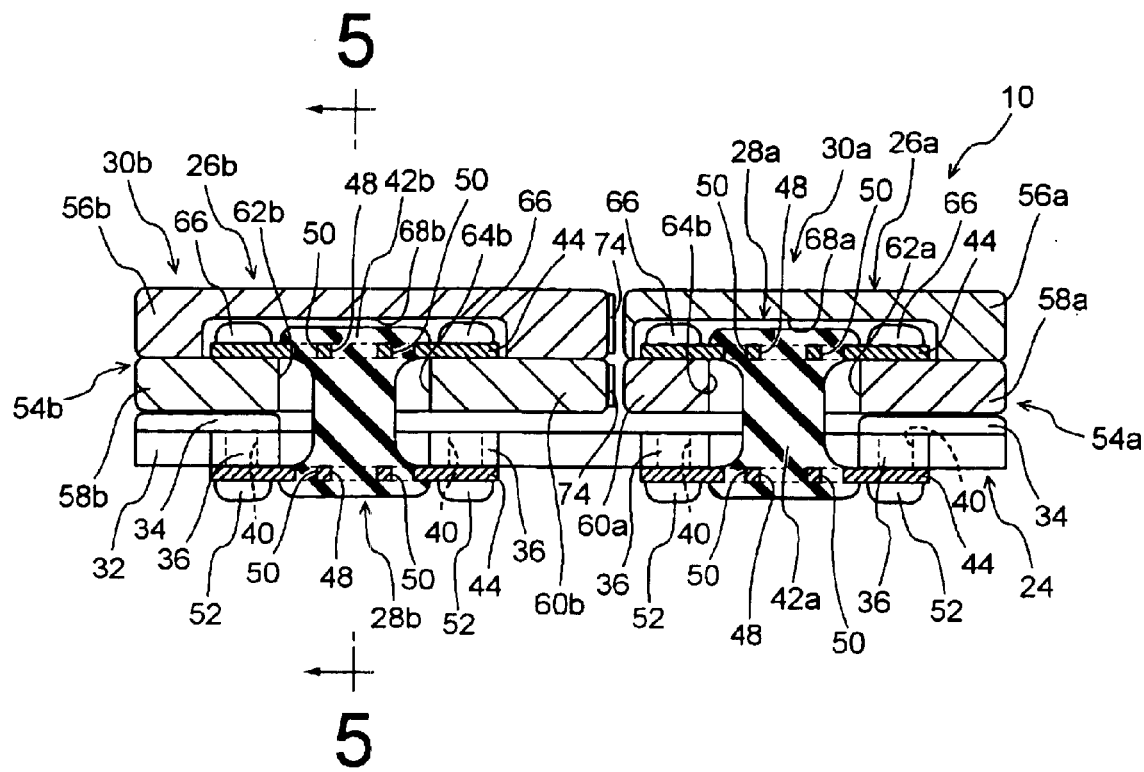
FIG. 4 is a cross-sectional view of the dynamic damper of FIG. 3 taken along line 4—4 of FIG. 5.
Figure 5:
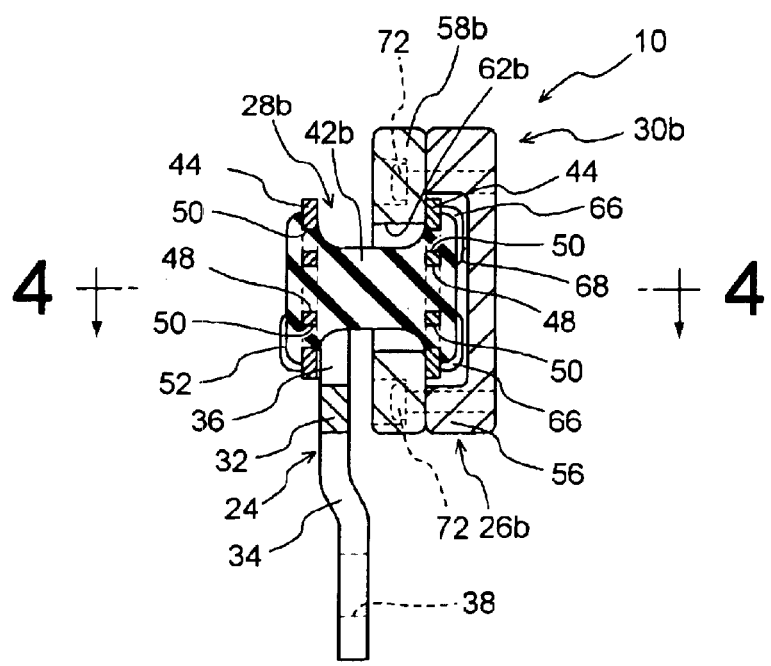
FIG. 5 is a cross-sectional view taken along line 5—5 of FIG. 4.

As is apparent from FIGS. 3–5, the dynamic damping device 10 includes two dynamic dampers 30a and 30b. Namely, mass members in the form of damper masses 26a and 26b are elastically supported by spring members in the form of elastic coupling members 28a and 28, on a bracket 24 that is adapted to be fixed to the reinforcing member 16 of the steering wheel 12, to thereby provide the two dynamic dampers 30a, 30b. With the dynamic damping device 10 attached to the steering wheel 12 via the bracket 24, the two dynamic dampers 30a, 30b function as two secondary vibration systems with respect to the steering system as the primary vibration system.

The bracket 24 is made of a rigid material such as metal, and has a construction in which the body part 32 having a longitudinal plate shape includes a pair of mounting arms 34, 34 and a plurality of mounting projections 36 (e.g., four in this embodiment) integrally provided such that the mounting arms 34 and the mounting projections 36 protrude on both side along the widthwise direction (e.g., the vertical direction in FIG. 3). Described in detail, the mounting arms 34 are integrally formed at longitudinally opposite ends of the body part 32 so as to protrude on one side along the widthwise direction (downward in FIG. 3). Each of the mounting arms 34, 34 has an approximately rectangular, planar shape, and is slightly bent in the central portion in the protruding direction, while being provided with a bolt hole 38 at the end of the protruding portion. Also, the mounting projections 36, 36, 36, 36 are integrally formed in four mutually spaced apart locations along the longitudinal direction of the body part 32 so as to protrude in the direction (upward in FIG. 3) of the other side on the widthwise direction of the body part 32. Each of the mounting projections 36 has an approximately rectangular, planar shape, and is equipped with a mounting hole 40 at the end of its protrusion.

On the other hand, the elastic coupling members 28a and 28b are approximately identical with each other in shape and construction, and each including a coupling rubber-elastic member 42. The coupling rubber-elastic member 42 is a solid rod member extending axially and straightly with an approximately constant circular cross-sectional shape in its entirety. A pair of fixing metal members 44, 44, which have approximately same shape, are bonded to the axially opposite end portions of each coupling rubber-elastic member 42 in the process of vulcanization of a rubber material for forming the coupling rubber-elastic member 42, whereby the fixing metal members 44, 44 and the coupling rubber-elastic member 42 cooperate to form an integral vulcanized product.

Each of the pair of fixing metal member 44, 44 is formed of a thin, rectangular, planar metal member with approximately the same shape, and is provided with bolt through-holes 46 being formed in the four corners of each fixing metal member 44. Each fixing metal member 44 is also formed with a central through hole 48 and a plurality of connecting holes 50 located radially outward of the central through hole 48, and are arranged in the circumferential direction at regular intervals. When the axially opposite end faces of the coupling rubber-elastic member 42 are bonded to the opposing surfaces of the fixing metal members 44, 44, respectively, in the above mentioned vulcanization process, the rubber material for forming the coupling rubber-elastic member 42 extends outward through the central through hole 48 and the plurality of connecting holes 50, and is bonded to the outside surfaces of the fixing metal members 44, 44 so as to close the openings of the central through holes 48 and the plurality of connecting holes 50 of the fixing metal members 44, 44. Accordingly, the pair of fixing metal members 44, 44 are firmly bonded to the axially opposite end portions of the coupling rubber-elastic member 42 such that the fixing metal members 44 are partially embedded within the axially opposite end portions of the coupling rubber-elastic member 42, respectively. In the present embodiment, each elastic coupling member 28 is made symmetrical about its central axis in its entirety for the sake of ease in assembling the elastic coupling member 28 with the other member of the dynamic dampers 30a, 30b.

The elastic coupling member 28a constructed as described above is fixedly assembled with the bracket 24 such that one of the fixing metal members 44 of the elastic coupling member 28a is superposed on and fixed to two mounting projections 36, 36 provided on one side in the longitudinal direction, e.g., on the right-hand side as seen in FIG. 3 of the bracket 24, by means of mounting bolts 52, 52, which are screwed into the fixing bores 40, 40 of the two mounting projections 36, 36 and the bolt-through holes 46, 46 formed through the lower side of the fixing metal member 44 as seen in FIG. 3. Likewise, the elastic coupling member 28b is fixedly assembled with the bracket 24 such that one of the fixing metal members 44 of the elastic coupling member 28b is superposed on and fixed to two mounting projections 36, 36 provided on the other side in the longitudinal direction, e.g., on the left-hand side as seen in FIG. 3 of the bracket 24, by means of the mounting bolts 52, 52, which are screwed into the mounting holes 40, 40 of the two mounting projections 36, 36 and the bolt through-holes 46, 46 provided on the lower side of the fixing metal member 44 as seen in FIG. 3.

Also, the elastic coupling members 28a, 28b are fixedly assembled with the damper masses 26a, 26b, respectively. Each of the damper masses 26a, 26b has a thick-walled approximately rectangular block shape in its entirety, and is made of a high gravity metallic material such as iron or the like. The damper masses 26a, 26b are approximately identical with each other in their height dimension and thickness dimension, but the width dimensions, i.e., the lengthwise dimensions parallel to the longitudinal direction of the bracket 24, are made different from each other so that the weight of the damper mass 26b is made larger than the weight of the damper mass 26a. Further, each of the damper masses 26a, 26b includes an interior mass member 54 (a, b) and an exterior mass member 56 (a, b), which are superposed on each other in the thickness direction (i.e., the vertical direction) as seen in FIG. 4. In other words, each damper mass 26 (a, b) is divided at its approximately central portion in the thickness direction into the interior mass member 54 (a, b) provided on the side of the elastic coupling member 28 (a, b) and the exterior mass member 56 (a, b) provided so as to protrude outward in the axial direction from the elastic coupling member 28 (a, b). These interior and exterior mass members 54 (a, b), 56 (a, b) are superposed on each other at their opposing surfaces, and bolted together to thereby constitute the damper mass 26 (a, b).

Each interior mass member 54 (a, b) has a divided structure, namely is divided into an exterior division unit 58 (a, b) and an interior division unit 60 (a, b), which are opposed to each other with the elastic coupling member 28 (a, b) interposed therebetween in the width direction (i.e., the horizontal direction in FIG. 3) of the interior mass member 54 (a, b). Each exterior division unit 58 (a, b) is an approximately rectangular thick-walled plate member and provided with a cutout portion 62 extending over the entire thickness thereof with a semicircular cross-section and open in the surface opposing to the interior division unit 60 (a, b). Likewise, the interior division unit 60 (a, b) is an approximately rectangular thick-walled plate member and provided with a cutout portion 64 extending over the entire thickness thereof with a semicircular cross-section and open in the surface opposing to the exterior division unit 58 (a, b). The exterior and interior division units 58 (a, b), 60 (a, b) constructed as described above are opposed to each other with a slight spacing interposed between the opposing surfaces thereof so that the cutout portions 62, 64 open in the opposing surfaces cooperate to form a storage space with a large diameter in which the elastic coupling member 28 (a, b) is disposed with a slight radial spacing interposed between the outer circumferential surface of the elastic coupling member 28 (a, b) and the inner circumferential surface of the cutout portions 62, 64. The mutually opposed exterior and interior division units 58 (a, b), 60 (a, b) are firmly fixed to the other fixing metal member 44 bonded to the other axial end portions of the elastic coupling member 28 (a, b), which portions is away from the bracket 24, by means of a plurality of mounting bolts 66. In other words, the use of the above-described interior mass member 54 (a, b) with the above-described divided structure, makes it possible to dispose the interior mass member 54 (a, b) so as to surround the elastic coupling member 28 (a, b).

On the other hand, the exterior mass member 56 (a, b) has an approximately rectangular, planar shape, that is substantially identical with the interior mass member 54 (a, b). The exterior mass member 56 (a, b) is held in close contact with an exterior surface of the interior mass member 54 (a, b), and bolted to the interior mass member 54 (a, b) by means of a plurality of bolts 72, whereby the exterior mass member 56 (a, b) and the interior mass member 54 (a, b) are integrated together to be provided as the damper mass 26 (a, b). In this respect, the exterior mass member 56 (a, b) is furnished with a recess 68 (a, b), opening in the surface to be superposed on the interior mass member 54 (a, b) so that the fixing metal member 44 and the head of the bolts 66 fixed to the interior mass member 54 (a, b) are housed within the recess 68 when the exterior mass member 56 (a, b) is superposed on the interior mass member 54 (a, b).

Further, rubber buffers 74, 74 are formed on inside edges of the interior and exterior mass members 54b, 56b of the damper mass 26b, which are opposed to inside edges of the interior and exterior mass members 54a, 56a of the damper mass 26a. The provision of the rubber buffers 74, 74 makes it possible to reduce or minimize impact energy or noises when the damper masses 26a, 26b are brought into abutting contact with each other due to an impulsive application of a significantly large vibrational load to the dynamic damping device 10.

In the present embodiment, as discussed above, the damper masses 26a, 26b are elastically connected to the bracket 24 via the elastic coupling members 28a, 28b, respectively, to thereby provide mutually independent two dynamic dampers 30a, 30b, and these dynamic dampers 30a, 30b are tuned to different natural frequencies by changing the weights of the damper masses 26a, 26b from each other.

Meanwhile, the steering wheel 12 has a natural frequency that varies over a given frequency range (hereinafter referred to as the "natural frequency range of the steering wheel 12") due to the change of the axial length of the telescopic steering column 14 caused by expanding and contracting the telescopic steering column 14. In the present embodiment, the dynamic damper 30a has a natural frequency fa that is tuned to a frequency higher than the central value f0 of the natural frequency range of the steering wheel 12 while being held within the natural frequency range of the steering wheel 12. On the other hand, the dynamic damper 30b has a natural frequency fb that is tuned to a frequency lower than the central value f0 of the natural frequency range of the steering wheel 12, while being held within the natural frequency range of the steering wheel 12. Further, a difference value Δf=(fa−fb) is arranged to be held within a range of 10–40% of the central value f0 of the natural frequency range of the steering wheel 12. In addition, the central value of the natural frequency fa of the dynamic damper 30a and the natural frequency fb of the dynamic damper 30b, i.e., (fa+fb)/2, is made substantially equal to the central value f0 of the natural frequency range of the steering wheel 12 in the present embodiment, but it is not essential to practice the present invention.

In the dynamic damping device 10 of the present embodiment, each of the two dynamic dampers 30 (a, b) is arranged such that the principal elastic axis of the coupling rubber-elastic member 42 (a, b) of the elastic coupling member 28 (a, b) is approximately conformity with the principal inertial axis of the corresponding damper mass 26 (a, b). The damper mass 26 (a, b) is fixed on one side of the coupling rubber-elastic member 42 (a, b) so as to protrude outwardly from the coupling rubber-elastic member 42 (a, b), as seen in the principal elastic axis of the coupling rubber-elastic member 42 (a, b). This arrangement assures that the center of gravity of the damper mass 26 (a, b) is set in a position at around the elastic center of the coupling rubber-elastic member 42 (a, b).

The dynamic damping device 10 constructed as described above is mounted on the boss part 20 of the reinforcing member 16 of the steering wheel 12, such that the central axes of the coupling rubber-elastic members 42a, 42b of the elastic coupling members 28a, 28b extend parallel to the central axis of the steering wheel 12, and are fastened to the boss part 20 by means of bolts 76, 76, which are inserted into the bolt holes 38, 38 formed in the fixing members 34, 34 of the bracket 24. With the dynamic damping device 10 fixedly mounted on the steering wheel 12 as described above, the coupling rubber-elastic members 42a, 42b undergo shearing deformation and have a circular shape in cross-section in a radial direction perpendicular to the central axis of the steering wheel 12.

As a result of special tunings as described above that are made to the dynamic dampers 30a, 30b of the dynamic damping device 10 of the present invention, the dynamic damping device 10 constructed according to the present embodiment is able to exhibit an excellent vibration damping effect with respect to vibrations excited in the steering wheel 12 with high stability, owing to only the two dynamic dampers 30a, 30b, if the natural frequency of the steering wheel 12 varies over a relatively wide frequency range due to the change of the axial length of the telescopic steering column 14 caused by expanding and contracting the telescopic steering column 14.

In the present embodiment, the spokes 22 of the steering wheel 12 are arranged in the circumferential direction to be concentrically located on one side in a diametric direction of the steering wheel 12 (i.e., a lower side as seen in FIG. 1), and the dynamic damping device 10 is mounted on the other side in the diametric direction of the steering wheel (i.e., an upper side as seen in FIG. 1), to be opposed to the spokes 22 in this diametric direction with a central axis of the steering wheel interposed therebetween. This arrangement makes it possible to eliminate or reduce adverse effects on the weight balance of the steering wheel about the central axis of the steering wheel due to the installation of the dynamic damping device 10 whose weight is increased by using the plurality of dynamic dampers 30a, 30b.

To further clarify technical effects of the dynamic damping device for a steering system constructed according to the present invention, the vibration damping effect of the dynamic damping device 10 of the present embodiment for a steering system including a telescopic steering column were actually measured, while changing tuning characteristics of the dynamic damping device 10. The results of the measurements will be described.

Initially, Example 1 of the dynamic damping device 10 was prepared such that the natural frequencies fa, fb of the dynamic dampers 30a, 30b were tuned to 38 Hz and 28.5 Hz, respectively, so that the difference value $\Delta f$ (=fa−fb) was set to 9.5 Hz. Example 1 of the dynamic damper 10 thus prepared was mounted on a dynamic model of the steering system including the telescopic steering column, and the natural frequency of the steering system was changed among three varieties, i.e., 33 Hz, 37 Hz and 40 Hz, by changing (expanding/contracting) the axial length of the steering column. For all the three varieties, a frequency sweep vibration application was performed at an acceleration of ±0.002G on the dynamic model, and the vibration conditions of the steering wheel were measured. In Example 1, the central value f0 of the natural frequency range of the steering wheel was set to 36.5 Hz, and the difference $\Delta f$ between the tuning frequencies of the two dynamic dampers 30a, 30b was made equal to 26% of the central value f0 of the natural frequency range of the steering wheel.

Figure 6:
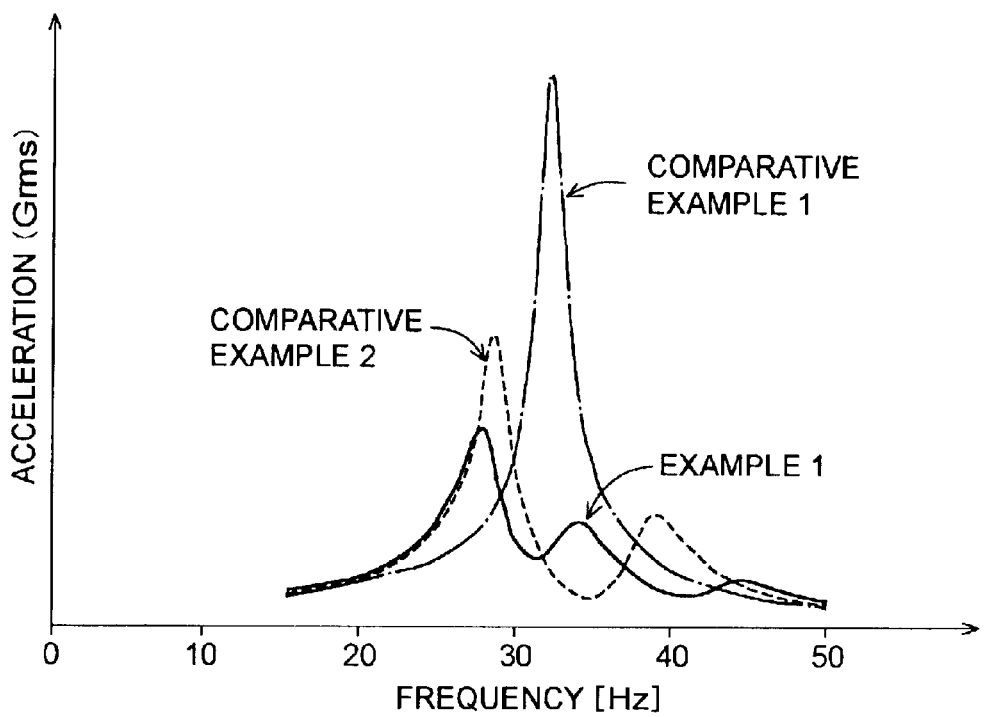
FIG. 6 is a graph showing a measurement of frequency characteristics of vibration acceleration of Example 1 of the dynamic damping device of the invention, together with the same measurements with respect to Comparative examples 1 and 2.
Figure 7:
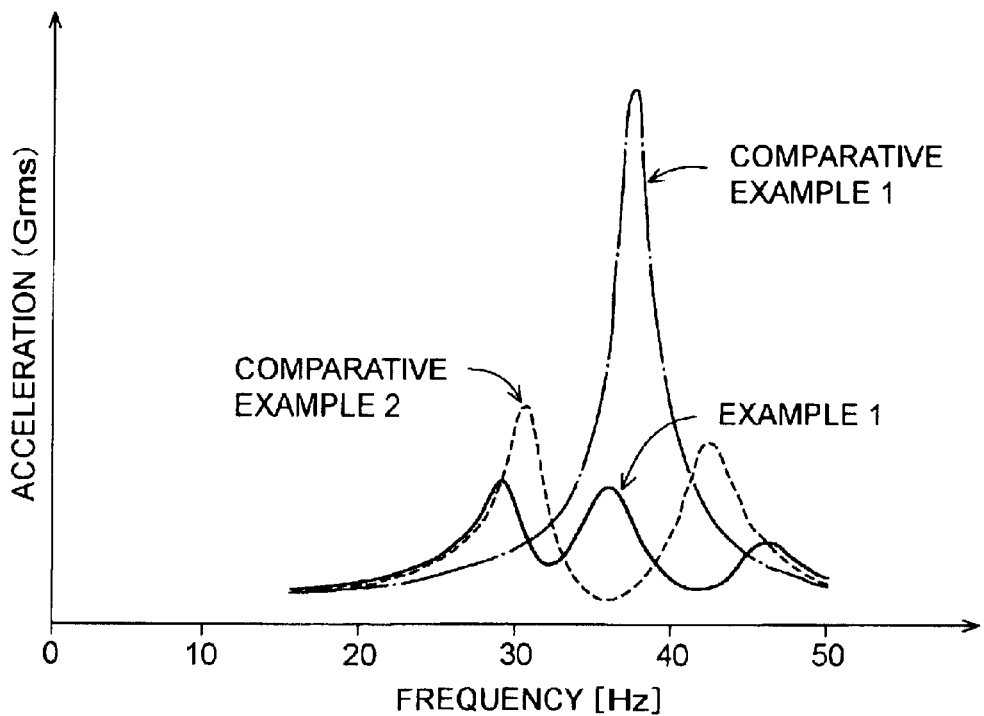
FIG. 7 is a graph corresponding to FIG. 6, where the frequency characteristics of Example 1 and Comparative examples 1 and 2 are measured under another condition different from the condition in the measurement of FIG. 6.
Figure 8:
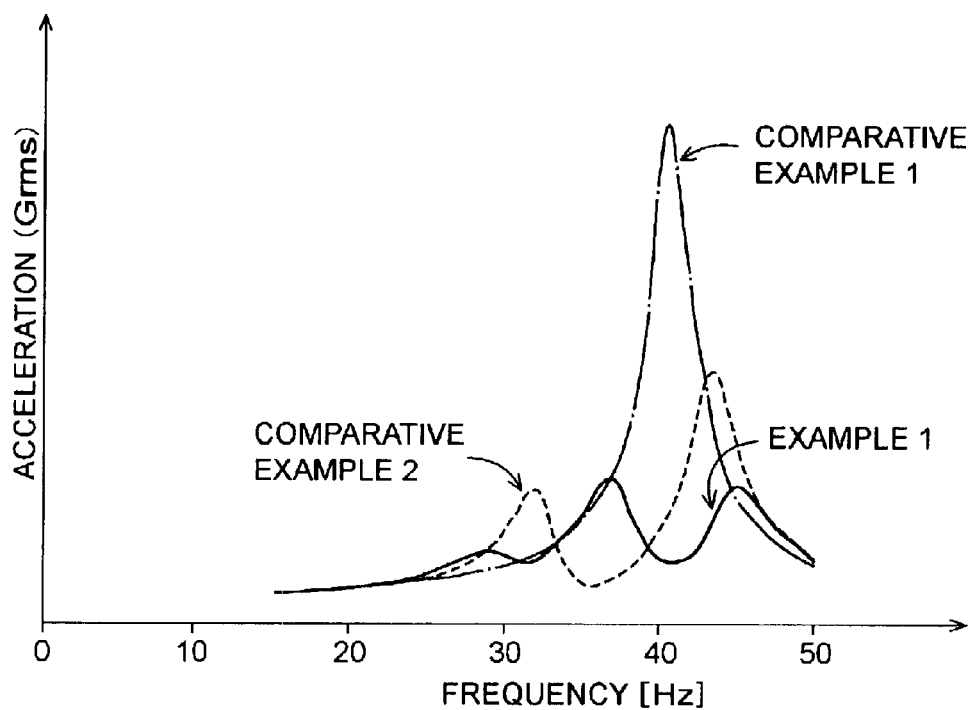
FIG. 8 is a graph corresponding to FIG. 6, where the frequency characteristics of Example 1 and Comparative examples 1 and 2 are measured under yet another condition different from the conditions in the measurements of FIGS. 6 and 7.

The obtained measurements are indicated in the graph of FIGS. 6–8 as Example 1. Specifically, FIG. 6 shows the measurements when the natural frequency of the steering wheel was tuned to 33 Hz, and FIG. 7 shows the measurements when the natural frequency of the steering wheel was tuned to 37 Hz, while FIG. 8 shows the measurements when the natural frequency of the steering wheel was tuned to 40 Hz. As Comparative Example 1, the vibration condition of the same dynamic model of the steering system was measured with no dynamic damping device mounted thereon. Described in detail, the natural frequency of the steering system with no dynamic damping device mounted was changed among the three varieties, i.e., 33 Hz, 37 Hz and 40 Hz, and the vibration conditions of the steering wheel were measured according to the same manner as in Example 1. The obtained measurements are also indicated in the graph of FIGS. 6–8 as Comparative Example 1. As Comparative Example 2, the vibration conditions of the same dynamic model of the steering system were measured with a conventional dynamic damper of single-mass type mounted. This single-mass type dynamic damper was tuned to the central value f0 of the natural frequency range of the steering wheel of the dynamic model. Like the Comparative Example 1, the natural frequency of the steering system with the single-mass type dynamic damper mounted was changed among the three varieties, i.e., 33 Hz, 37 Hz and 40 Hz, and the vibration conditions of the steering wheel were measured according to the same manner as in Example 1. The obtained measurements are also indicated in the graph of FIGS. 6–8 as Comparative Example 2.

The results of measurements indicated in the graphs of FIGS. 6–8 reveal that the dynamic damping device 10 (Example 1) constructed according to the present invention can sufficiently attenuate or minimize the maximum level or magnitude of vibrations excited in the steering wheel, if the natural frequency of the steering wheel is changed to any frequency ranges. As to Comparative Example 1, it is understood from the graphs of FIGS. 6–8 that vibrations having significantly large level or magnitude were excited at around the natural frequencies of the steering wheel. It is also admitted from the graphs of FIGS. 6–8 that the conventional dynamic damper according to Comparative Example 2 cannot exhibit sufficient damping effect in comparison with the results of Example 1.

Next, Example 2 of the dynamic damping device 10 was prepared such that the natural frequencies fa, fb of the dynamic dampers 30a, 30b were tuned to 38 Hz and 33.5 Hz, respectively, so that the difference value $\Delta f$ (=fa−fb) was set to 4.5 Hz. Example 2 of the dynamic damper 10 thus prepared was mounted on the dynamic model of the steering system including the telescopic steering column, and the natural frequency of the steering system was changed among three varieties, i.e., 33 Hz, 37 Hz and 40 Hz, by changing (expanding/contracting) the axial length of the steering column. For all the three varieties, the frequency sweep vibration application was performed at an acceleration of ±0.002G on the dynamic model, and the vibration conditions of the steering wheel were measured. In Example 2, the central value f0 of the natural frequency range of the steering wheel was set to 36.5 Hz, and the difference $\Delta f$ between the tuning frequencies of the two dynamic dampers 30a, 30b was made equal to 12% of the central value f0 of the natural frequency range of the steering wheel.

Figure 9:
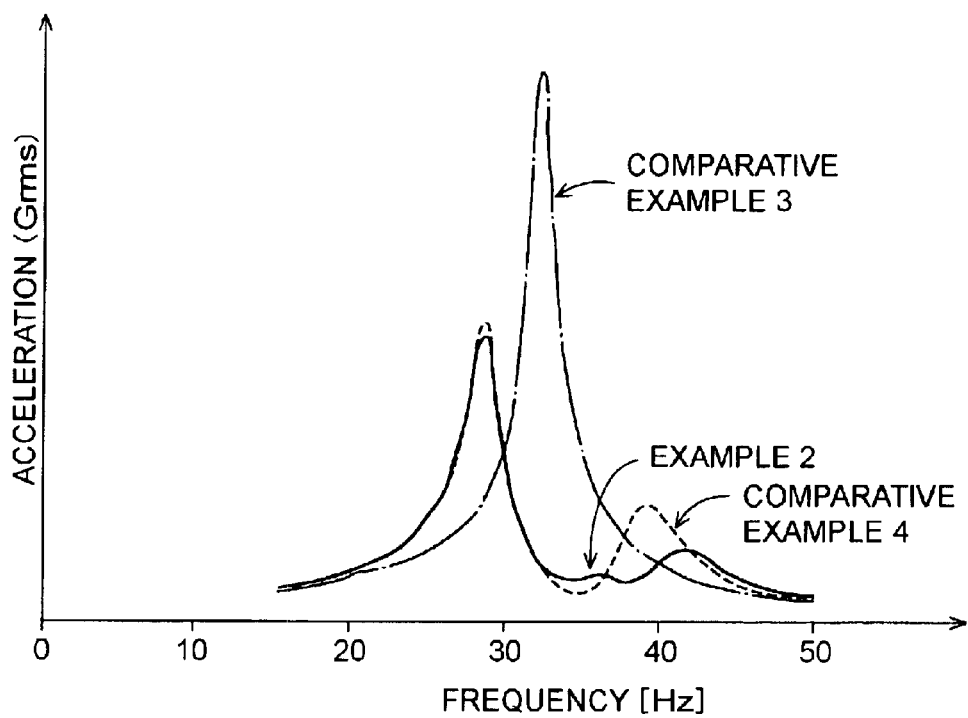
FIG. 9 is a graph showing a measurement of frequency characteristics of vibration acceleration of Example 2 of the dynamic damping device of the invention, together with the same measurements with respect to Comparative examples 3 and 4.
Figure 10:
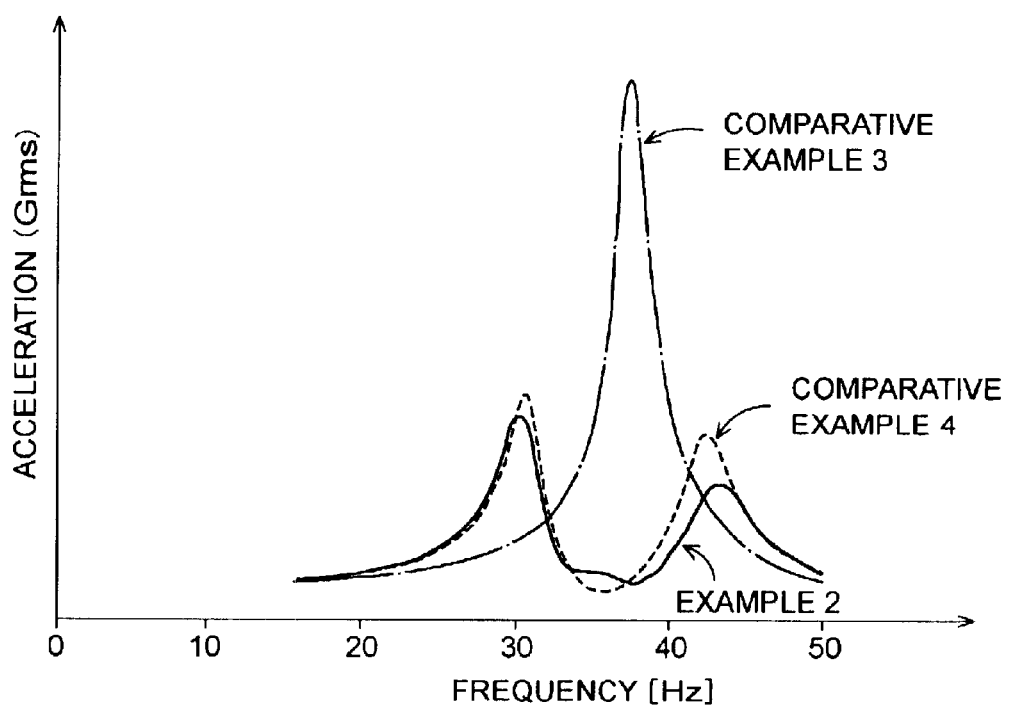
FIG. 10 is a graph corresponding to FIG. 9, where the frequency characteristics of Example 2 and Comparative examples 3 and 4 are measured under another condition different from the condition in the measurement of FIG. 9.
Figure 11:
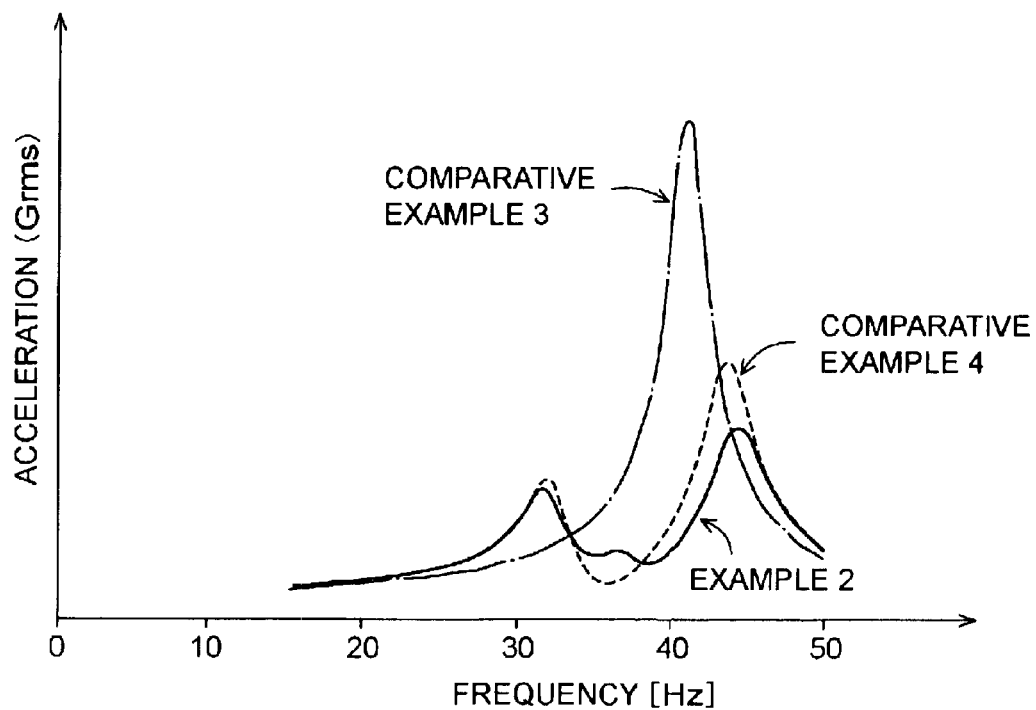
FIG. 11 is a graph corresponding to FIG. 6, where the frequency characteristics of Example 2 and Comparative examples 3 and 4 are measured under yet another condition different from the conditions in the measurements of FIGS. 9 and 10.

The obtained measurements are indicated in the graph of FIGS. 9–11 as Example 2. Specifically, FIG. 9 shows the measurements when the natural frequency of the steering wheel was tuned to 33 Hz, and FIG. 10 shows the measurements when the natural frequency of the steering wheel was tuned to 37 Hz, while FIG. 11 shows the measurements when the natural frequency of the steering wheel was tuned to 40 Hz. As Comparative Example 3, the vibration condition of the same dynamic model of the steering system was measured with no dynamic damping device mounted thereon. Described in detail, the natural frequency of the steering system with no dynamic damping device mounted was changed among the three varieties, i.e., 33 Hz, 37 Hz and 40 Hz, and the vibration conditions of the steering wheel were measured according to the same manner as in Example 2. The obtained measurements are also indicated in the graph of FIGS. 9–11 as Comparative Example 3. As Comparative Example 4, the vibration conditions of the same dynamic model of the steering system were measured with the single-mass type dynamic damper mounted. This single-mass type dynamic damper was tuned to the central value f0 of the natural frequency range of the steering wheel of the dynamic model. Like the Comparative Example 3, the natural frequency of the steering system with the single-mass type dynamic damper mounted was changed among the three varieties, i.e., 33 Hz, 37 Hz and 40 Hz, and the vibration conditions of the steering wheel were measured according to the same manner as in Example 2. The obtained measurements are also indicated in the graph of FIGS. 9–11 as Comparative Example 4.

The results of measurements indicated in the graphs of FIGS. 9–11 reveal that the dynamic damping device 10 (Example 2) constructed according to the present invention can sufficiently attenuate or minimize the maximum level or magnitude of vibrations excited in the steering wheel, if the natural frequency of the steering wheel is changed to any frequency ranges. As to Comparative Example 3, it is understood from the graphs of FIGS. 9–11 that vibrations having significantly large level or magnitude were excited at around the natural frequencies of the steering wheel. It is also admitted from the graphs of FIGS. 9–11 that the conventional dynamic damper according to Comparative Example 4 cannot exhibit sufficient damping effect in comparison with the results of Example 2.

Further, Example 3 of the dynamic damping device 10 was prepared such that the natural frequencies fa, fb of the dynamic dampers 30a, 30b were tuned to 38 Hz and 28.5 Hz, respectively, so that the difference value Δf (=fa−fb) was set to 9.5 Hz. Example 3 of the dynamic damper 10 thus prepared was mounted on the dynamic model of the steering system including the telescopic steering column, and the natural frequency of the steering system was changed among three varieties, i.e., 33 Hz, 37 Hz and 42 Hz, by changing (expanding/contracting) the axial length of the steering column. For all the three varieties, the frequency sweep vibration application was performed at an acceleration of ±0.02G on the dynamic model, and the vibration conditions of the steering wheel were measured. Yet further, Example 4 of the dynamic damping device 10 was prepared such that the natural frequencies fa, fb of the dynamic dampers 30a, 30b were tuned to 38 Hz and 33.5 Hz, respectively, so that the difference value Δf (=fa−fb) was set to 4.5 Hz Example 4 of the dynamic damper 10 thus prepared was mounted on the same dynamic model as in the Example 3, and the vibration condition of the steering wheel was measured in the same manner as in the Example 3, while changing the natural frequency of the steering system among three varieties, i.e., 33 Hz, 37 Hz and 42 Hz. Still further, Example 5 of the dynamic damping device 10 was prepared such that the natural frequencies fa, fb of the dynamic dampers 30a, 30b were tuned to 41.5 Hz and 28.5 Hz, respectively, so that the difference value Δf (=fa−fb) was set to 13 Hz. Example 5 of the dynamic damper 10 thus prepared was mounted on the same dynamic model as in the Example 3, and the vibration condition of the steering wheel was measured in the same manner as in the Example 3, while changing the natural frequency of the steering system among three varieties, i.e., 33 Hz, 37 Hz and 42 Hz. In these Examples 3–5, the central value f0 of the natural frequency range of the steering wheel was set to 37.5 Hz, and the difference Δf (=fa−fb) between the tuning frequencies of the two dynamic dampers 30a, 30b was held within a range of 12–35% of the central value f0 of the natural frequency range of the steering wheel.

Figure 12:
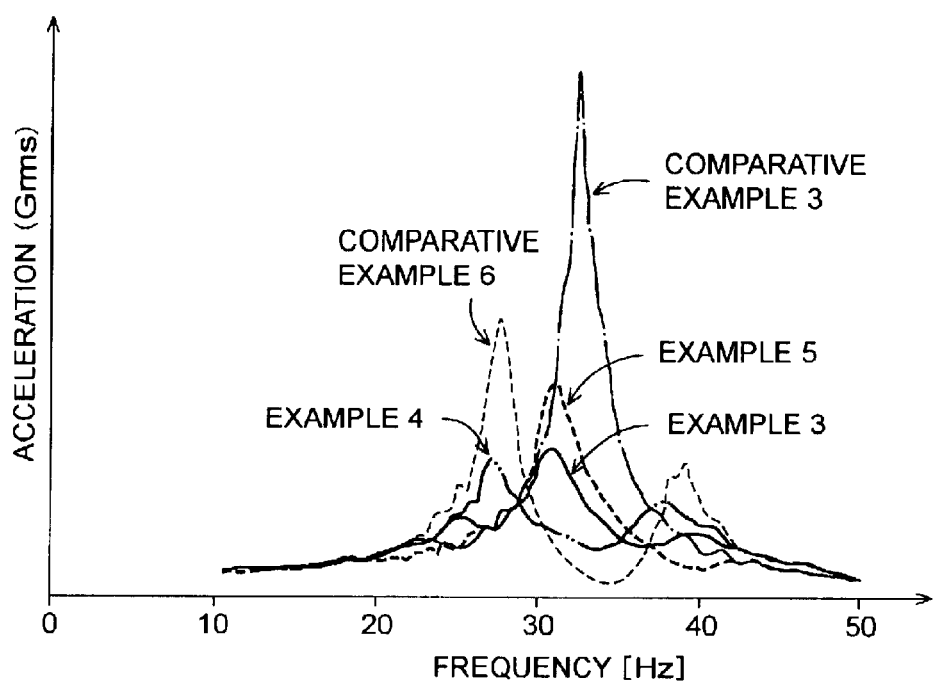
FIG. 12 is a graph showing measurements of frequency characteristics of vibration acceleration of Examples 3–5 of the dynamic damping device of the invention, together with the same measurements with respect to Comparative examples 3 and 6.
Figure 13:
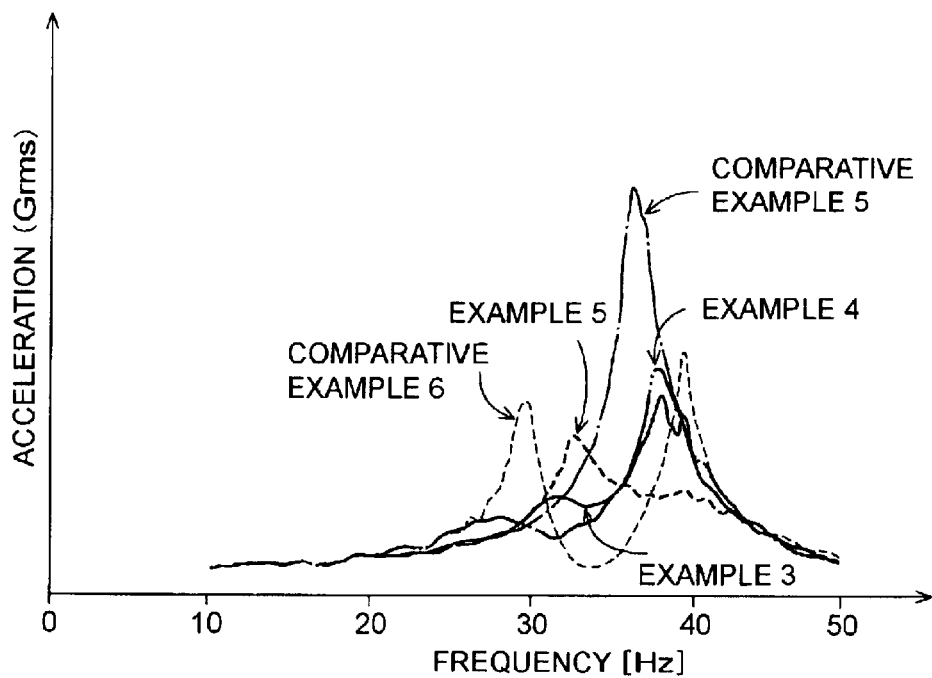
FIG. 13 is a graph corresponding to FIG. 12, where the frequency characteristics of Examples 3–5 and Comparative examples 5 and 6 are measured under another condition different from the condition in the measurement of FIG. 12.
Figure 14:
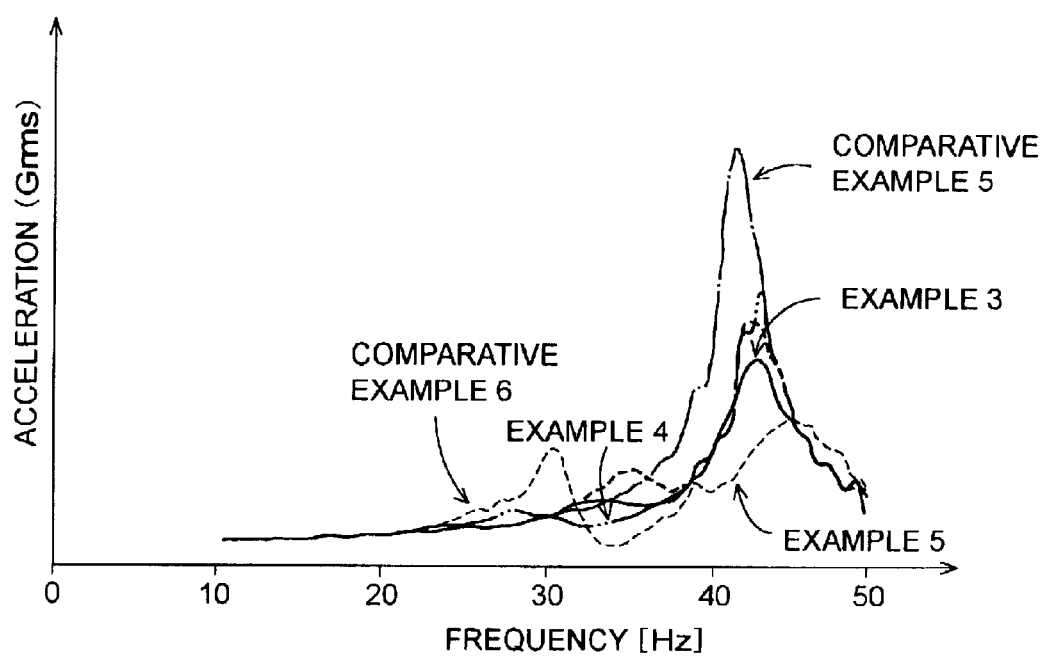
FIG. 14 is a graph corresponding to FIG. 12, where the frequency characteristics of Examples 3–5 and Comparative examples 5 and 6 are measured under yet another condition different from the conditions in the measurements of FIGS. 12 and 13.

The obtained measurements are indicated in the graph of FIGS. 12–14 as Examples 3–5. Specifically, FIG. 12 shows the measurements when the natural frequency of the steering wheel was tuned to 33 Hz, and FIG. 13 shows the measurements when the natural frequency of the steering wheel was tuned to 37 Hz, while FIG. 14 shows the measurements when the natural frequency of the steering wheel was tuned to 42 Hz As Comparative Example 5, the vibration condition of the same dynamic model of the steering system as in the Examples 3–5 was measured with no dynamic damping device mounted thereon. Described in detail, the natural frequency of the steering system with no dynamic damping device mounted was changed among the three varieties, i.e., 33 Hz, 37 Hz and 42 Hz, and the vibration conditions of the steering wheel were measured according to the same manner as in Examples 3–5. The obtained measurements are also indicated in the graph of FIGS. 12–14 as Comparative Example 5. As Comparative Example 6, the vibration conditions of the same dynamic model of the steering system as in the Examples 3–5 were measured with the the single-mass type dynamic damper mounted. This single-mass type dynamic damper was tuned to the central value f0 of the natural frequency range of the steering wheel of the dynamic model. Like the Comparative Example 5, the natural frequency of the steering system with the single-mass type dynamic damper mounted was changed among the three varieties, i.e., 33 Hz, 37 Hz and 42 Hz, and the vibration conditions of the steering wheel were measured according to the same manner as in Examples 3–5. The obtained measurements are also indicated in the graph of FIGS. 12–14 as Comparative Example 6.

The results of measurements indicated in the graphs of FIGS. 12–14 reveal that the dynamic damping device 10 (Examples 3–5) constructed according to the present invention can sufficiently attenuate or minimize the maximum level or magnitude of vibrations excited in the steering wheel, if the natural frequency of the steering wheel is changed to any frequency ranges. As to Comparative Example 5, it is understood from the graphs of FIGS. 12–14 that vibrations having significantly large level or magnitude were excited at around the natural frequencies of the steering wheel. It is also admitted from the graphs of FIGS. 12–14 that the conventional dynamic damper according to Comparative Example 6 cannot exhibit sufficient damping effect in comparison with the results of Examples 3–5

While the present invention has been described in detail with its presently preferred embodiments for the illustrative purpose only, it is to be understood that the invention is not limited to the details of the illustrated embodiments, but may be otherwise embodied.

In the illustrated embodiment, the spring member for elastically supporting one mass member is embodied by the elastic coupling member 28 in the form of a single rubber elastic body member. The one mass member may be supported by the elastic coupling member consisting of a plurality of rubber elastic body members. In order to permit the elastic coupling member to exhibit stabilized spring constant under a condition where a direction of input vibration varies due to the rotation of the steering wheel, the plurality of rubber elastic body members desirably comprise more than three rubber elastic body members that extend in the direction of the central axis of the steering column or steering wheel. Preferably, these elastic coupling members have a circular shape in cross-section in a radial direction perpendicular to the central axis of the steering column or the steering wheel.

In the case where one mass member is elastically supported by the spring member consisting a plurality of elastic coupling members, the plurality of elastic coupling members may desirably support an outer peripheral portion of the mass member. According to this arrangement, actual support points of the mass member can be spaced away from the center of gravity of the mass member, effectively preventing irregular displacement of the mass member.

While the illustrated dynamic damping device for use in a steering system employs two mutually independent dynamic dampers by way of example, it is possible to employ three or more dynamic dampers. In this case, two of the three or more dynamic dampers, which have natural frequencies adjacent to each other, are tuned such that the difference value between the natural frequencies of the two dynamic dampers are held within 10–40% of the central value of the natural frequency of the steering wheel.

In the illustrated embodiment, the two dynamic dampers 30a, 30b of the dynamic damping device are mounted on the steering wheel 12 by way of example. The dynamic dampers may be suitably mounted on any other positions in the steering system, while taking into account an available space for installing the dynamic dampers, a vibration mode of the steering system, or the like. For instance, the dynamic dampers may be mounted on the steering column, or alternatively may be mounted on both of the steering column and the steering wheel.

In the illustrated embodiment, the elastic coupling member 28 is formed independently of the damper mass 26 and the bracket 24, and is bolted to these members 26, 24. It may be possible to directly bond the elastic coupling member 28 to one or both of the damping mass 26 and the bracket 24, in the process of vulcanization of a rubber material for forming the elastic coupling member 28, thereby providing an integral vulcanized product consisting of the elastic coupling member 28 and the damper mass 26 and/or the bracket 24.

In the illustrated embodiment, the damper mass 26 consists of the exterior mass member 56 disposed axially outward of the protruding axial end face of the elastic coupling member 28 and the interior mass member 54 disposed axially inward of the protruding axial end face of the elastic coupling member 28, by way of example. The damper mass 26 may have a variety of shapes or structures without being limited to the illustrated embodiment. For instance, the damper mass 26 may be constituted by only one of the external or internal mass members 56, 54.

Further, the mass member and the spring member employed in the dynamic damper of the present invention may be suitably arranged in terms of shape and size, while taking into account an available space for installing the dynamic damper, a required vibration damping characteristics, or the like, but may not be limited to those in the illustrated embodiment. For instance, it is also possible to employ a mass member with a circular cross-section or a spring member with a polygonal cross-section, and it is also possible, of course, to change the shape of the bracket accordingly. In addition, the spring member may be bonded directly to the steering wheel or the steering column with no bracket interposed therebetween.

It is also to be understood that the present invention may be embodied with various other changes, modifications and improvements, which may occur to those skilled in the art, without departing from the spirit and scope of the invention defined in the following claims.

What is claimed is:

1. A dynamic damping device for use in a steering system equipped with a telescopic steering column of an automotive vehicle, and adapted to be mounted on a steering column and/or a steering wheel of the steering system for damping vibrations excited in the steering wheel, the dynamic damping device comprising:

a plurality of dynamic dampers each including a mass member and a spring member for elastically supporting said mass member with respect to the steering column or the steering wheel, said plurality of dynamic dampers being independent of each other, wherein said plurality of dynamic dampers have respective natural frequencies that are arranged such that at least two of said natural frequencies of said plurality of dynamic dampers are tuned respectively to a higher and a lower frequency range in relation to a central value of a range of variation in a natural frequency of the steering wheel due to an expansion or contraction of the telescopic steering column, and held within said range of variation in said natural frequency of the steering wheel, and such that differences between adjacent ones of said natural frequencies of said plurality of dynamic dampers are held within 10–40% of said central value of said range of variation in said natural frequency of the steering wheel, and wherein said spring member of each of said plurality of dynamic dampers comprises an elastic support member adapted to undergo shear deformation in a direction perpendicular to a central axis of the steering column or the steering wheel.

2. A dynamic damping device according to claim 1, wherein said elastic support member of each of said plurality of dynamic dampers has a circular shape in cross-section in said direction perpendicular to the central axis of the steering column or the steering wheel.

3. A dynamic damping device according to claim 1, wherein each of said plurality of dynamic dampers is arranged such that said elastic support member has a principal elastic axis that approximately conforms with a principal inertia axis of said mass member in a direction approximately parallel to the central axis of the steering column or the steering wheel.

4. A dynamic damping device according to claim 1, wherein a center of gravity of the steering wheel is offset from a central axis of the steering wheel in one diametric direction of the steering wheel, while the dynamic damping device is mounted on a position of the steering wheel that is opposed to the center of gravity of the steering wheel in the one diametric direction with the central axis of the steering wheel there between.

5. A dynamic damping device according to claim 1, further comprising a bracket adapted to be fixed to the steering column or the steering wheel of the steering system, and supporting said plurality of dynamic dampers.

6. A dynamic damping device according to claim 1, wherein a center of gravity of the steering wheel is offset from a central axis of the steering wheel in one diametric direction of the steering wheel, while the dynamic damping device is mounted on a position of the steering wheel that is opposed to the center of gravity of the steering wheel in the one diametric direction with the central axis of the steering wheel therebetween.

7. A dynamic damping device for use in a steering system equipped with a telescopic steering column of an automotive vehicle, and adapted to be mounted on a steering column and/or a steering wheel of the steering system for damping vibrations excited in the steering wheel, the dynamic damping device comprising:

a plurality of dynamic dampers each including a mass member and a spring member for elastically supporting said mass member with respect to the steering column or the steering wheel, said plurality of dynamic dampers being independent of each other, wherein said plurality of dynamic dampers have respective natural frequencies that are arranged such that at least two of said natural frequencies of said plurality of dynamic dampers are tuned respectively to a higher and a lower frequency range in relation to a central value of a range of variation in a natural frequency of the steering wheel due to an expansion or contraction of the telescopic steering column, and held within said range of variation in said natural frequency of the steering wheel, and such that differences between adjacent ones of said natural frequencies of said plurality of dynamic dampers are held within 10–40% of said central value of said range of variation in said natural frequency of the steering wheel, wherein said natural frequencies of said plurality of dynamic dampers are all held within said range of vibration in said natural frequency of the steering wheel due to said expansion or contraction of the telescopic steering column, and wherein said spring member of each of said plurality of dynamic dampers comprises an elastic support member adapted to undergo shear deformation in a direction perpendicular to a central axis of the steering column or the steering wheel.

* * * * *